United States Patent
Chen et al.

(10) Patent No.: US 7,358,882 B2
(45) Date of Patent: Apr. 15, 2008

(54) VIDEO PROCESSING METHOD AND APPARATUS

(75) Inventors: Chia-Hsin Chen, Taipei (TW); Chiu-Yuan Lin, Taipei (TW); Bor-Yuh Chang, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 0 days.

(21) Appl. No.: 11/424,612

(22) Filed: Jun. 16, 2006

(65) Prior Publication Data

US 2007/0146170 A1    Jun. 28, 2007

(30) Foreign Application Priority Data

Dec. 23, 2005  (TW) ............... 94146098 A

(51) Int. Cl.
*H03M 1/66* (2006.01)

(52) U.S. Cl. ....................... 341/144; 348/572

(58) Field of Classification Search ............. 341/155, 341/122, 141; 348/554, 682, 468, 569, 572
See application file for complete search history.

(56) References Cited

U.S. PATENT DOCUMENTS

| 5,231,398 | A | * | 7/1993 | Topper | 341/156 |
| 5,838,390 | A | * | 11/1998 | Hankinson et al. | 348/682 |
| 6,292,223 | B1 | * | 9/2001 | Englert | 348/468 |
| 6,697,122 | B2 | * | 2/2004 | Kim | 348/554 |
| 7,116,377 | B2 | * | 10/2006 | Zeidler et al. | 348/569 |

* cited by examiner

*Primary Examiner*—Peguy JeanPierre
(74) *Attorney, Agent, or Firm*—Thomas, Kayden, Horstemeyer & Risley

(57) ABSTRACT

A video processing method and apparatus to employing an analog user interface and a digital video decoder. A working mode is provided, according to which analog control signals from the analog user interface are selectively directed to an analog-to-digital converter. The analog control signal is converted to digital control signal to accordingly control the digital video decoder.

9 Claims, 9 Drawing Sheets

US 7,358,882 B2

VIDEO PROCESSING METHOD AND APPARATUS

BACKGROUND OF THE INVENTION

1. Field of the Invention

The invention relates to video processing, and in particular to video processing method and apparatus employing a conventional analog user interface to control a digital video decoder.

2. Description of the Related Art

FIG. 1 shows block functions of a conventional analog video decoder, in which analog video signal 101 is input through several inputs into analog video decoder 100, in which video multiplexer 102 selects and forwards the video signal 101 to analog signal processor 103 and, based upon the analog values of external variable resistors 104, analog signal processor 103 decodes and processes video signal 101 for output. In real world video applications, each variable resistor 104 is an analog user interface, for example, generating an analog control signal to fine tune the image quality of a display and having a corresponding knob on the display.

As complementary metal oxide semiconductor (CMOS) process progresses, analog video decoders, formerly implemented by bipolar transistors, have evolved into digital function. FIG. 2 shows a circuit of a conventional digital video decoder. Analog video signal 201, through several interfaces, is sent to digital video decoder 200, in which each video multiplexer 202 selects one of the inputs and forwards the video signal thereof to an analog-to-digital converter (ADC) 203. Analog video signal 201 is converted by ADC 203 to digital video signal 207 and sent to digital signal processor (DSP) 204. Based on the setup values in register set 205, DSP 204 processes digital video signal 207 to output corresponding digital signal 209. The control of digital video decoder 200 is provided by a digital interface 205, allowing access to content of register set 205 by way of protocols such as I2C or SPI.

The system client of video decoders, while wanting to gain the benefits of digital video decoders, may desire to keep the case of a display intact, with knobs and variable resistors unchanged. An ADC and micro control unit (MCU) may be added, accordingly.

FIG. 3 shows a combination circuit with a digital video processor, an external ADC, and an external MCU. In FIG. 3, external ADC 301 and external MCU 303 cooperate with digital video processor 300. Via external ADC 301, the setup values of variable resistors 302 are converted by ADC 301 from analog form into digital form. MCU 303 generates parameters corresponding to the digitalized setup values to accordingly control digital video processor 300. As mentioned, via a protocol between MCU 303 and digital video processor 300, MCU 303 can access or change the content in the register set of digital video processor 300, such that image quality of a corresponding display is controlled by variable resistors 302.

According to the foregoing description, control of a digital video processor through an analog interface entails addition of an ADC and MCU as a buffer between interfaces. Such a configuration increases costs due to the additional ADC and MCU. External ADC and MCU require more complicated storage management and more area on a printed circuit board (PCB), reducing yield. Even if the additional ADC and MCU are internally implemented, i.e., embedded in a digital video processor, the additional ADC occupies considerable area and complicates the design of the integrated digital video processor.

BRIEF SUMMARY OF THE INVENTION

An embodiment of the invention provides a video processing method suitable for use with an analog user interface and a digital video decoder. A working mode is provided. Based on the working mode, analog control signal from the analog user interface is selectively directed to an analog-to-digital converter. The analog control signal is converted to digital control signal to accordingly control the digital video decoder.

The invention also provides a video processing apparatus comprising a multiplexer, an analog-to-digital converter, a digital signal processor, and a switching means. The multiplexer receives an analog control signal from an analog user interface and analog video signal for output. The analog-to-digital converter converts the output of the multiplexer to a digital signal. The digital signal processor processes the digital signal. The switching means provides a working mode to accordingly control the multiplexer.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Due the variation in work environments and product positioning, digital video decoders are often equipped with embedded multiplexers and analog-to-digital converters to provide switching between signal inputs. Video and analog control signals can use ADCs respectively or share a common ADC with the help of a multiplexer. Embodiments of the invention, while showing only one multiplexer and one ADC, are not intended to limit the scope of the invention thereto and can easily embrace a combination of multiple multiplexers and ADCs.

Figure 1:
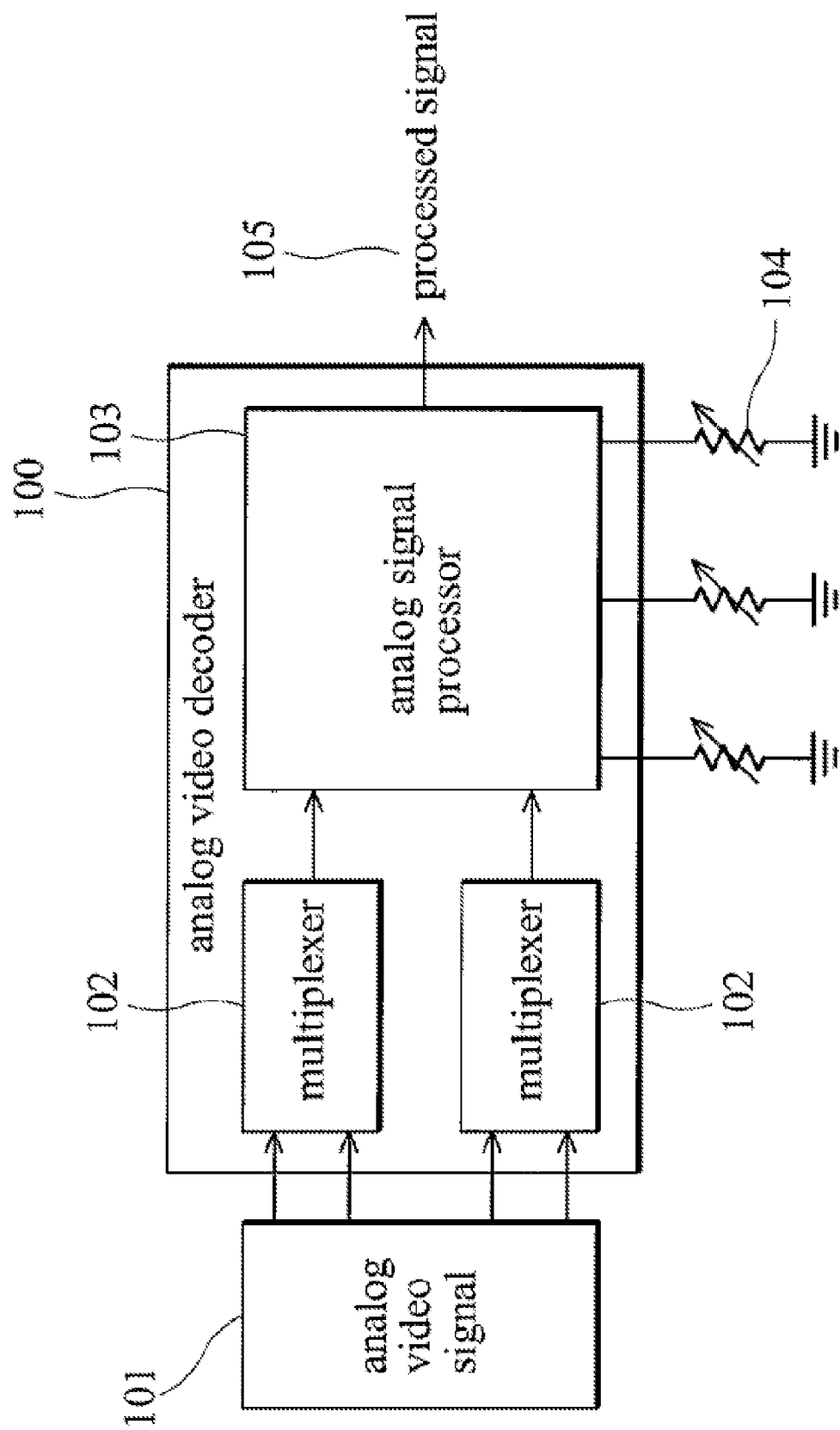
FIG. 1 shows block functions of a conventional analog video decoder.
Figure 2:
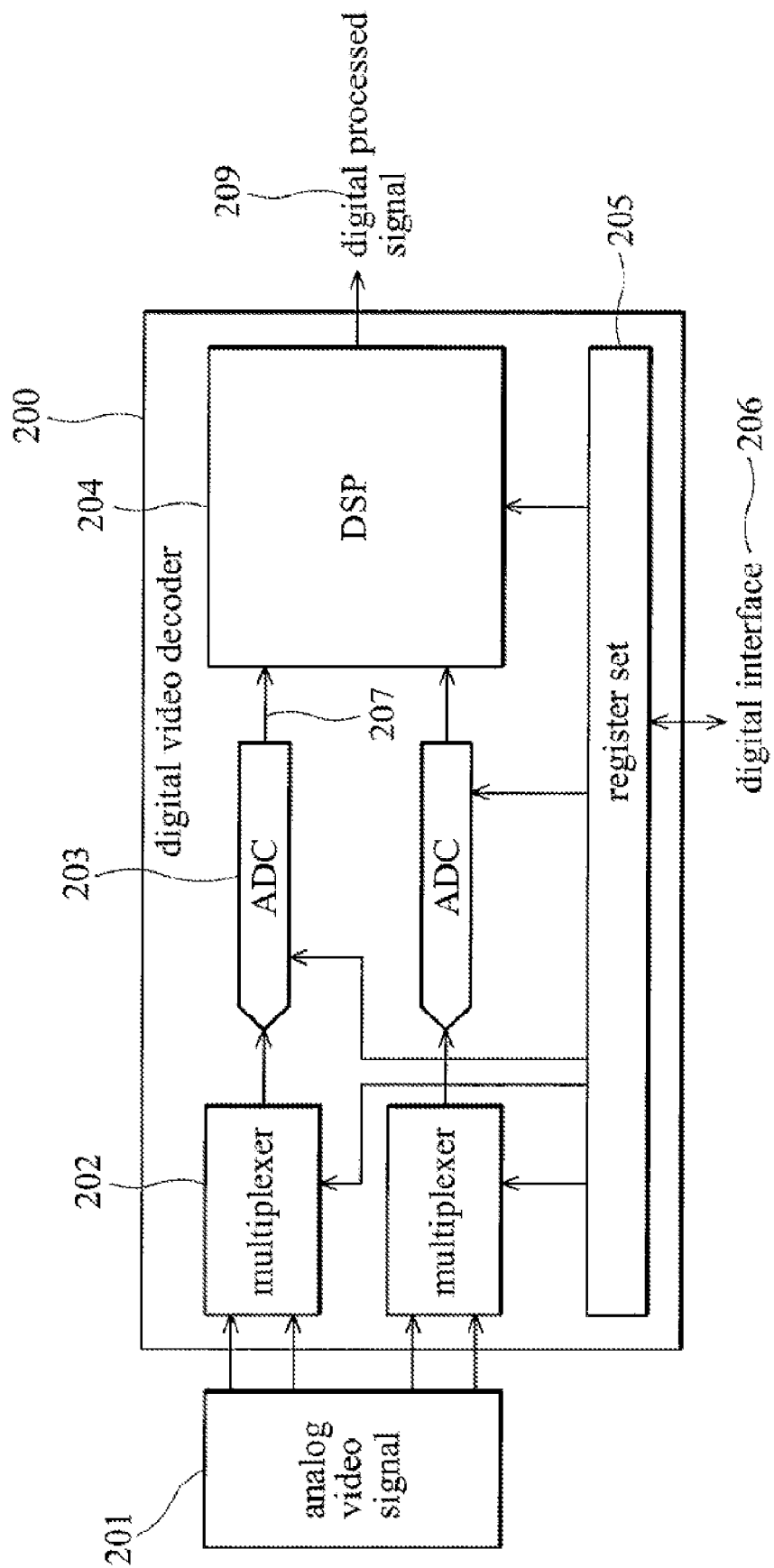
FIG. 2 shows a circuit of a conventional digital video decoder
Figure 3:
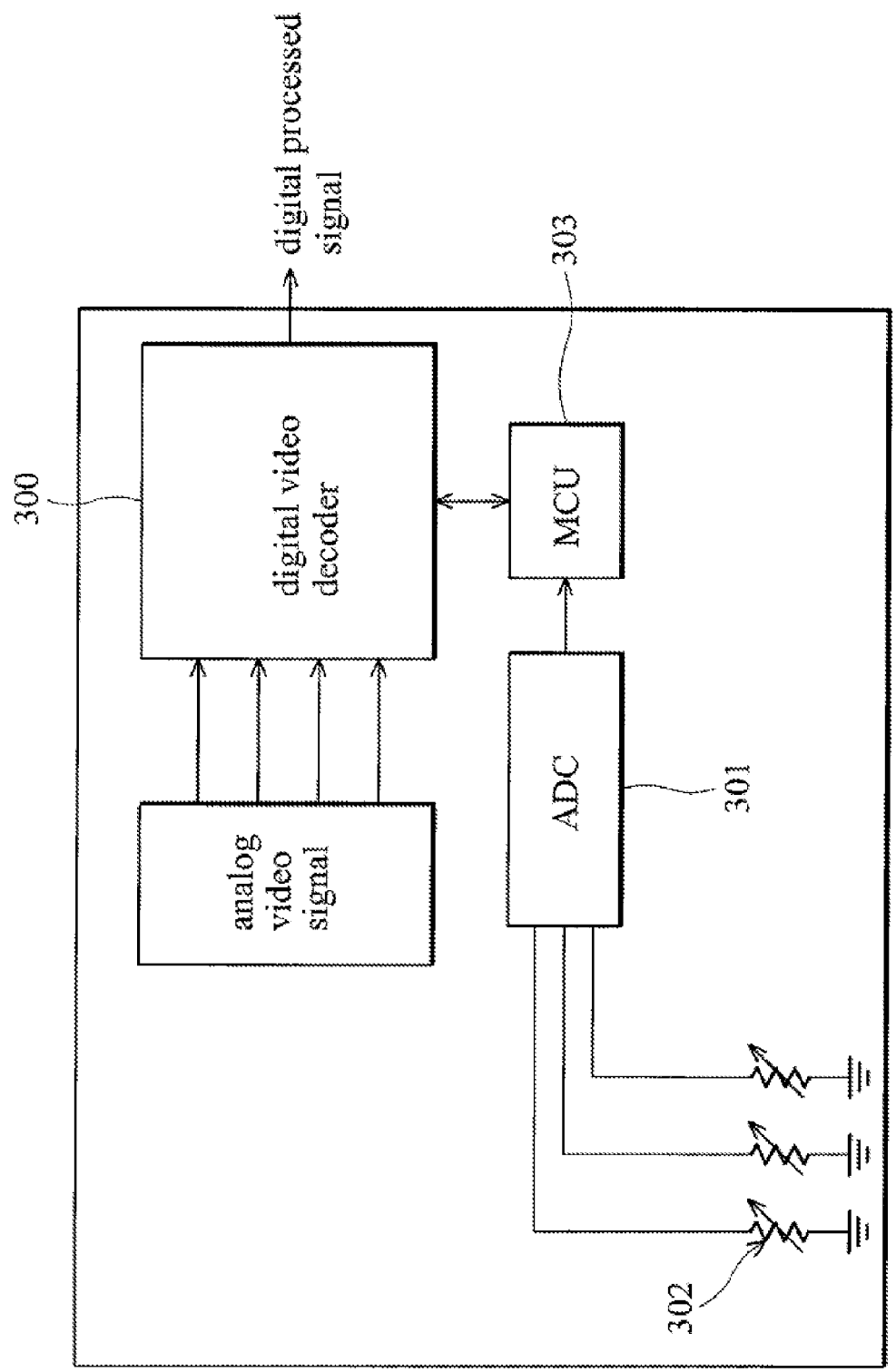
FIG. 3 shows a combination circuit with a digital video processor, an external ADC, and an external MCU.
Figure 4:
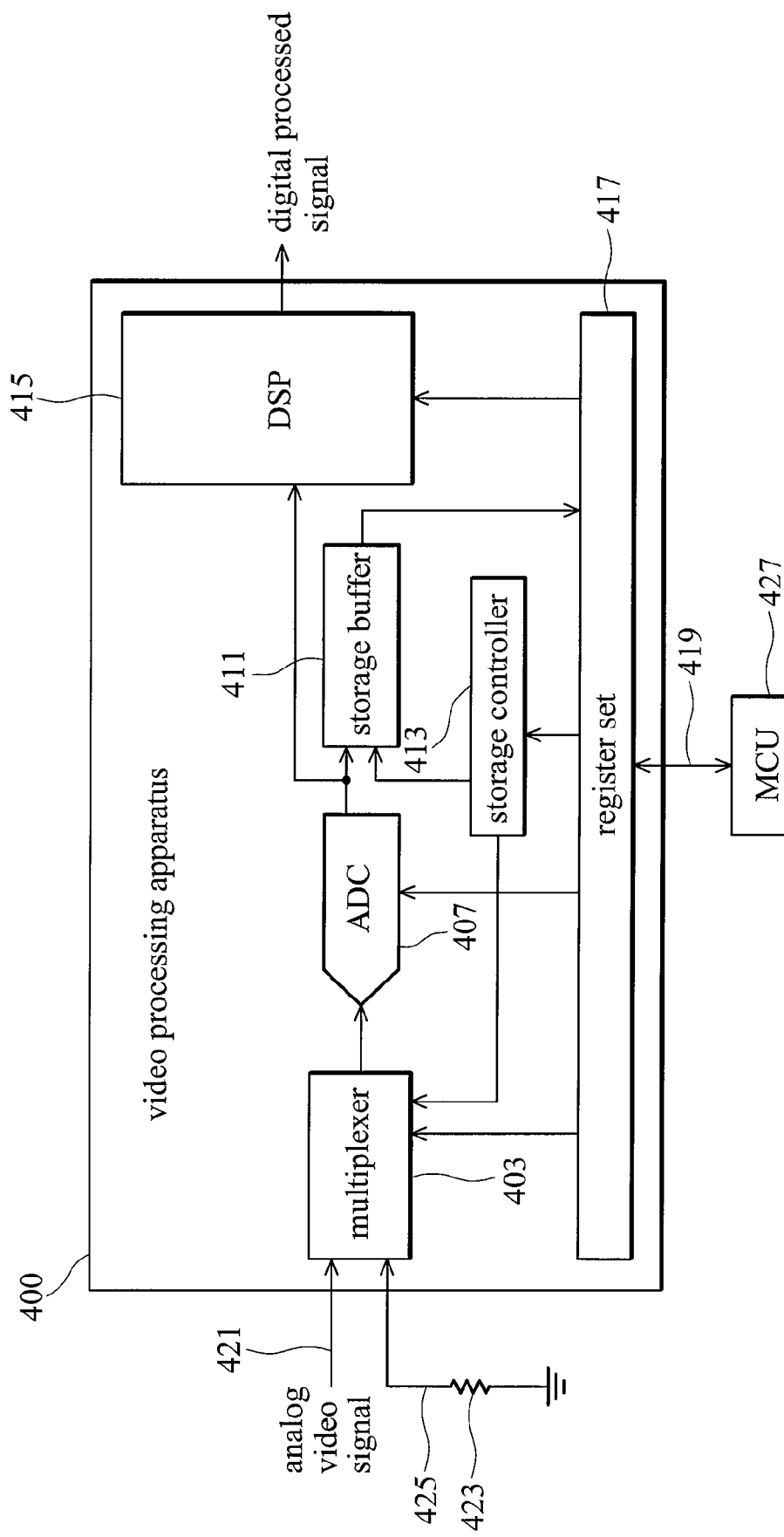
FIGS. 4, 5 and 6 show three embodiments of the invention, each showing a video processing apparatus capable of operating under a working mode.

FIG. 4 shows an embodiment of the invention, comprising a video processing apparatus capable of operating under a working mode. Video processing apparatus 400 has multiplexer 403, ADC 407, DSP 415, register set 417 and a switching means with storage buffer 411 and storage controller 413.

Several working modes are provided in storage controller 413. Analog video signal 421 and analog control signal 425 generated by an analog user interface (such as variable resistor 423) are sent to multiplexer 403. Based on whether analog control signal 425 can monopolize ADC 407, storage controller 413 is set by, for example, parameters in register set 417, to work under one of the working modes and determine the internal signal, paths for both analog video signal 421 and analog control signal 425. One of the working modes determines that ADC 407 is fully occupied by analog control signal 425 and some determine that ADC 407 works for analog control signal 425 only when ADC 407 is expected to be free from handling analog video signal 421. In other words, analog control signal 425 is selectively directed to ADC 407. The timing of switching during each mode is detailed later.

For example, when ADC 407 is chosen to process analog control signal 425, the current resistance of variable resistor 425 is read out by, for instance, a voltage divider, and sent to ADC 407 via a path temporarily or permanently provided by multiplexer 403. The resistance of variable resistor 425, an analog control signal, is converted to a digital form by ADC 407 and stored in storage buffer 411, which now buffers the digital value of the resistance of variable resistor 425. Through the output of storage buffer 411, register set 417 can read and store the digital value. Through digital interface 419, MCU 427 reads the digital value in register set 417 and feeds back to register set 417 corresponding parameters regarding, for example, contrast and brightness. DSP 415 thus is able to adjust the video signal according to the parameters stored in register set 417. Using the configuration shown in FIG. 4, an analog interface such as a variable resistor allows adjustment of image quality of a display. Furthermore, in other embodiments, MCU 427 may be embedded inside video processing apparatus 400 such that MCU 427 is able to directly access the content of register set without requiring digital interface 419.

When ADC 407 works for analog video signal 421, multiplexer 403 provides a path for analog video signal 421 to reach ADC 407 which outputs to DSP 415 rather than buffering in storage buffer 411.

Depending upon the circumstances of use, analog video signal 421 may originate with one or several interfaces. If analog video signal 421 originates with a single interface and video processing apparatus 400 has a further ADC capable of processing analog video signal 421 alone, ADC 407 can be dedicated to analog control signal 425 only. Here, a working mode named idle mode is set to ensure that multiplexer 403 provides a constant, permanent path for ADC 407 to access analog control signal 425.

If ADC 407 cannot be dedicated to analog control signal 425 due to the plurality of interfaces for analog video signal 421 or the lack of another ADC, ADC 407 can be temporarily switched to process analog control signal 425 when analog video signal 421 does not need ADC 407. For example, part of analog video signal 421 belongs to a blank period, during which the content of analog video signal 421 does not correspond to an image related to analog video signal 421 and may not require analog-to-digital conversion. Here, a working mode named blank mode can be set to make multiplexer 403 feed to ADC 407 analog control signal 425 during a blank period and analog video signal 421 during other periods.

Figure 5:
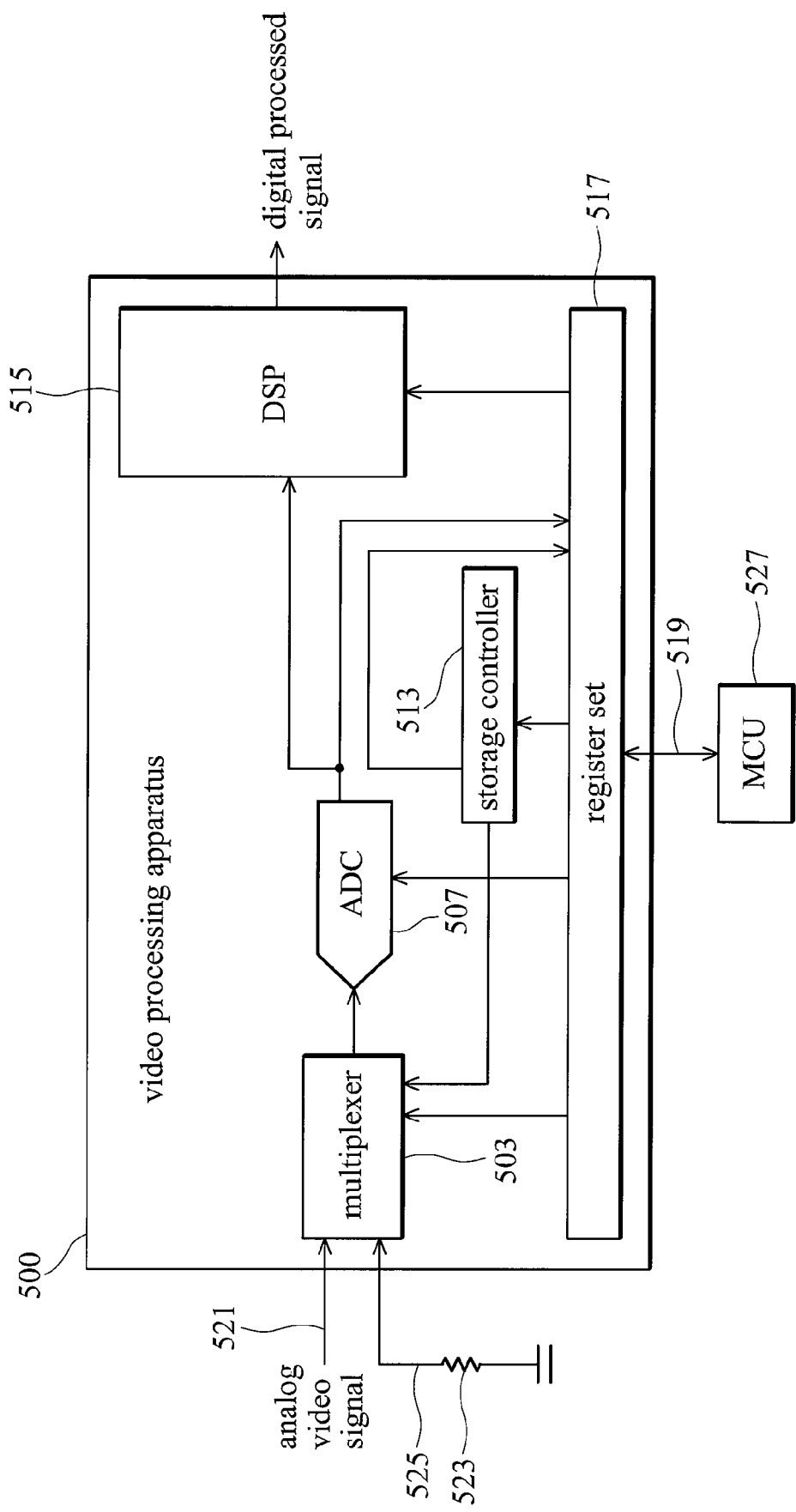

FIG. 5 shows another video processing apparatus capable of operating under a working mode according to embodiments of the invention. Video processing apparatus 500 has multiplexer 503, ADC 507, DSP 515, register set 517 coupled to digital interface 519, and a switching means with storage controller 513. Unlike video processing apparatus 400 in FIG. 4, FIG. 5 lacks a storage buffer such that register set 517 directly buffer the output of ADC 507. Signal paths and flows in FIG. 5 are similar to those in FIG. 4, and can be easily derived by one skilled in the art in view of the foregoing teaching regarding FIG. 4. Therefore, they are omitted here for brevity.

Figure 6:
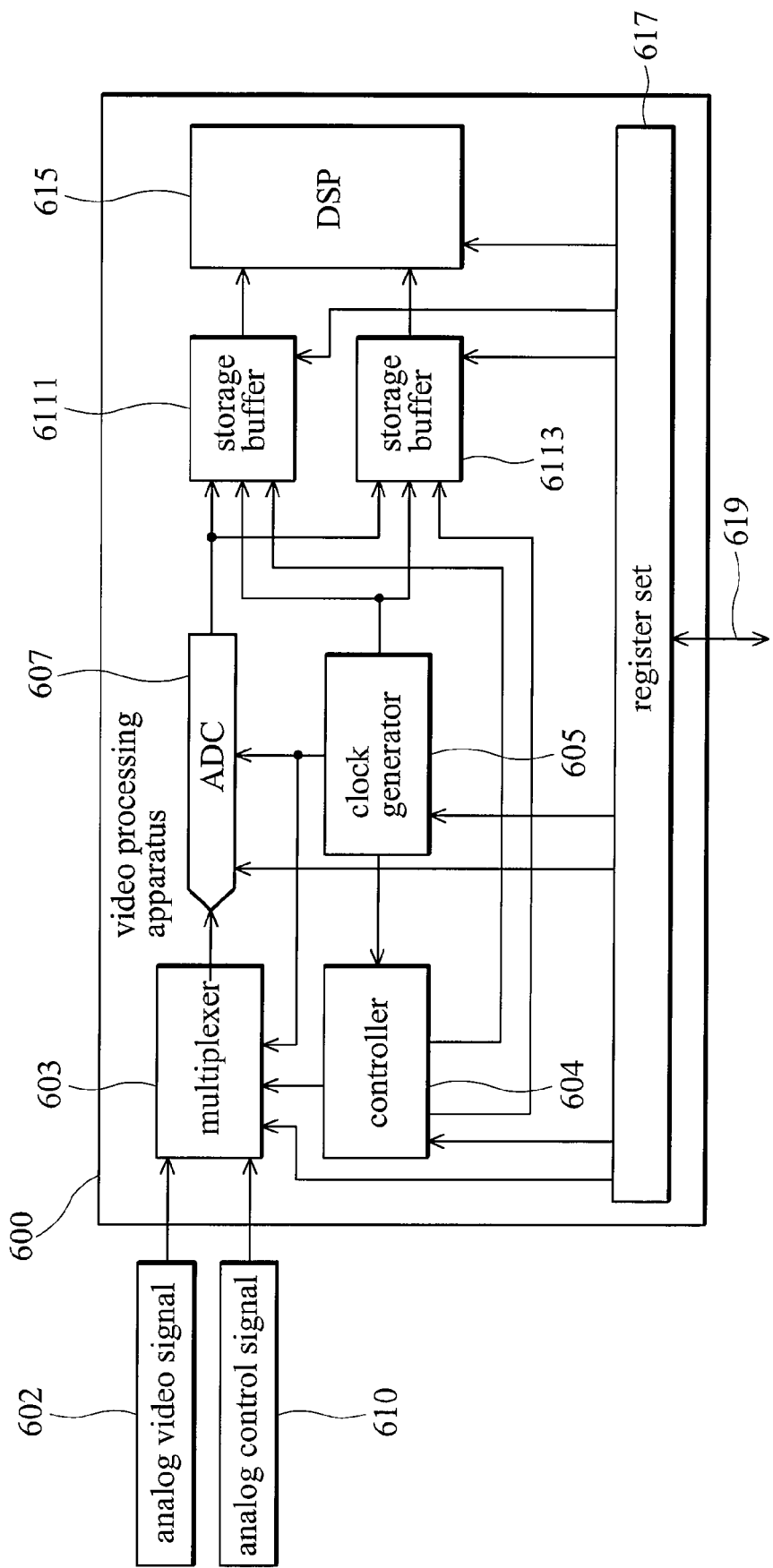

FIG. 6 shows another video processing apparatus capable of operating under a working mode according to embodiments of the invention. To provide several working modes, video processing apparatus 600 has multiplexer 603, ADC 607, DSP 615, register set 617 coupled to digital interface 619, and a switching means with controller 604, clock generator 605 and storage buffers (6111, 6113). Multiplexer 603 selects input for output and input signal may include analog video signal 602 and analog control signal 610 on different inputs, as shown in FIG. 6. ADC 607 converts input signal from an analog form to a digital form. Based on the working mode set in the controller 604, storage buffer 6111 buffers digitalized video signal for DSP 615. Controller 604 provides three working modes, idle mode, blank mode and multiple-frequency mode. All working modes are detailed later. Controller 604 controls the switch timing of multiplexer, and the access timing of storage buffers 6111 and 6113. Storage buffer 6113, similar to storage buffer 6111, works based on the set working mode to buffer digitalized control signal of an analog user interface for use by a MCU (not shown in FIG. 6) on the other end of digital interface 619. Storage buffers 6111 and 6113 also help subsequent stage, DSP 615 in FIG. 6, to receive continuous digitalized video signal and control signal. Clock generator 605 generates the clock signal required by ADC 607.

As mentioned before, the number of interfaces for analog video signal may vary such that one ADC in a video processing apparatus may or may not be dedicated to process analog control signal. Once ADC 607 is judged not capable of full-time processing of analog control signal 610, analog video signal shares ADC 607 with analog control signal 610 through multiplexer 603.

To be able to work under different circumstances, controller 604 of video processing apparatus 600 in FIG. 6 provides working mode options, as detailed as follows.

A. Idle mode: If input analog video signal 602 is Composite Video Burst Signal (CVBS) from a single interface and another ADC in video processing apparatus 600 is able to process the CVBS, for example, then ADC 607 is an idle component with respect to video signal process. Here, controller 604 can be set to work in idle mode, in which ADC 607 is dedicated to converting analog control signal 610 to a digital form, the digitalized control signal is buffered in storage buffer 6113 and register set 617, and a MCU (not shown in FIG. 6) generates corresponding parameters to control DSP 615 and adjust images.

Figure 7:
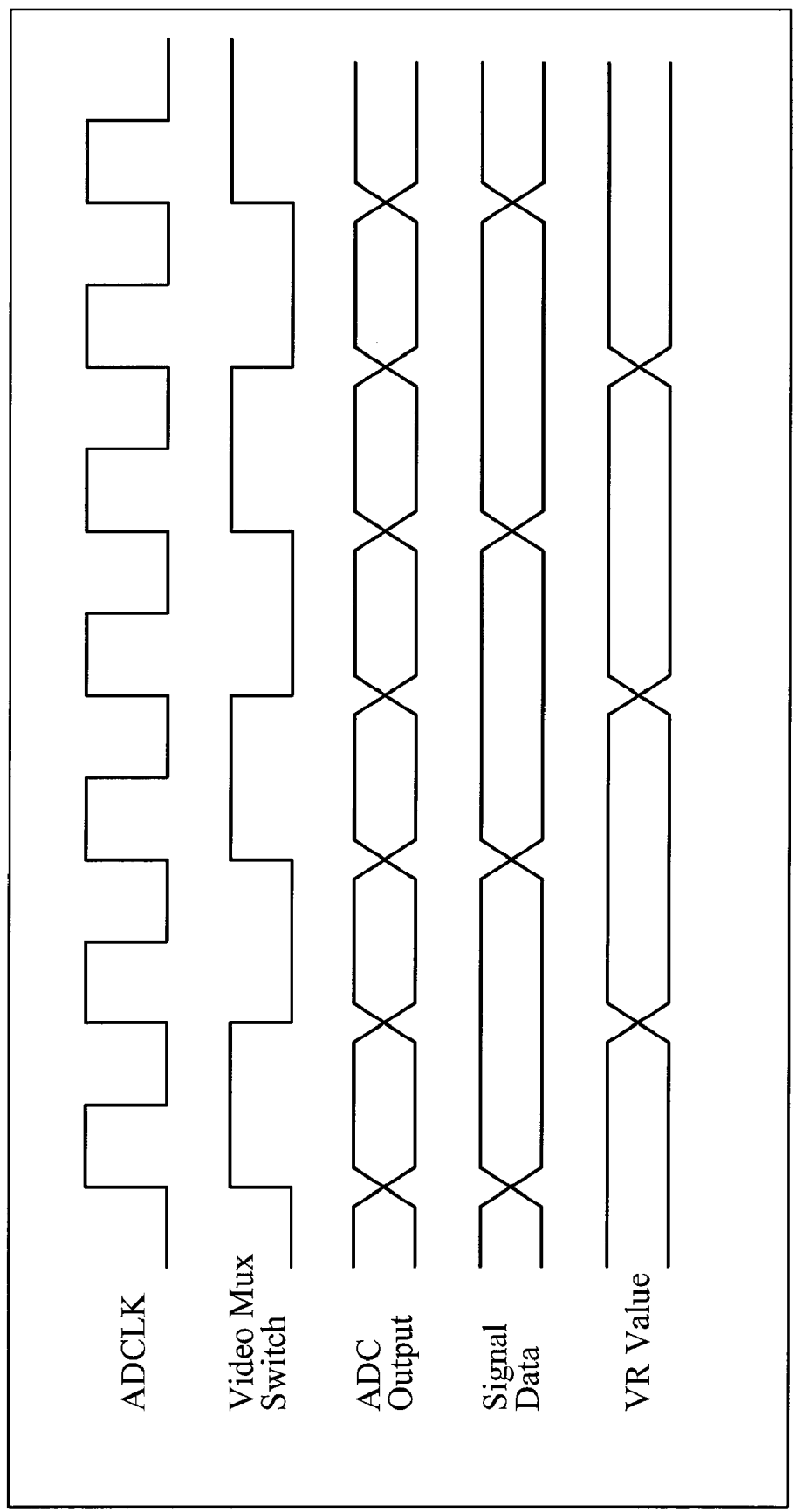
FIG. 7 depicts timing correlation between different signals.

B. Multiple-frequency mode: When analog video signal 602 such as S-video signals or R/G/B signals comes from a plurality of interfaces, each interface may need one ADC such that ADC 607 may not be freed from processing the analog video signal. Here, controller 604 can be set to work in a working mode named multiple-frequency mode, in which clock generator 605 provides to ADC 607 a clock with a clock frequency at least 2 times the clock frequency originally supplied to ADC 607. FIG. 7 depicts the timing correlation between different signals. Signal ADCLK is the clock signal having a multiple frequency. Signal of Video Mux Switch is generated by controller 604 to quickly switch the paths in multiplexer 603.

Because multiplexer 603 can be quickly switched and multiplying the clock frequency of ADC 607 creates useful bandwidth, analog control signals can utilize this extra bandwidth of ADC 607 for analog-to-digital conversion. Therefore, at the output of ADC 607, digitalized video signal is intervened by digitalized control signal, and vice versa. Signal of Video Mux Switch decides the destination of the output of ADC 607. When signal of Video Mux Switch is at a high level, current output of ADC 607 is expected to be a video signal, then buffered in storage buffer 6111. When signal of Video Mux Switch is at a low level, current output of ADC 607 is expected to be a digitized control signal, the resistance value of a variable resistor, then buffered in storage buffer 6113.

Figure 8:
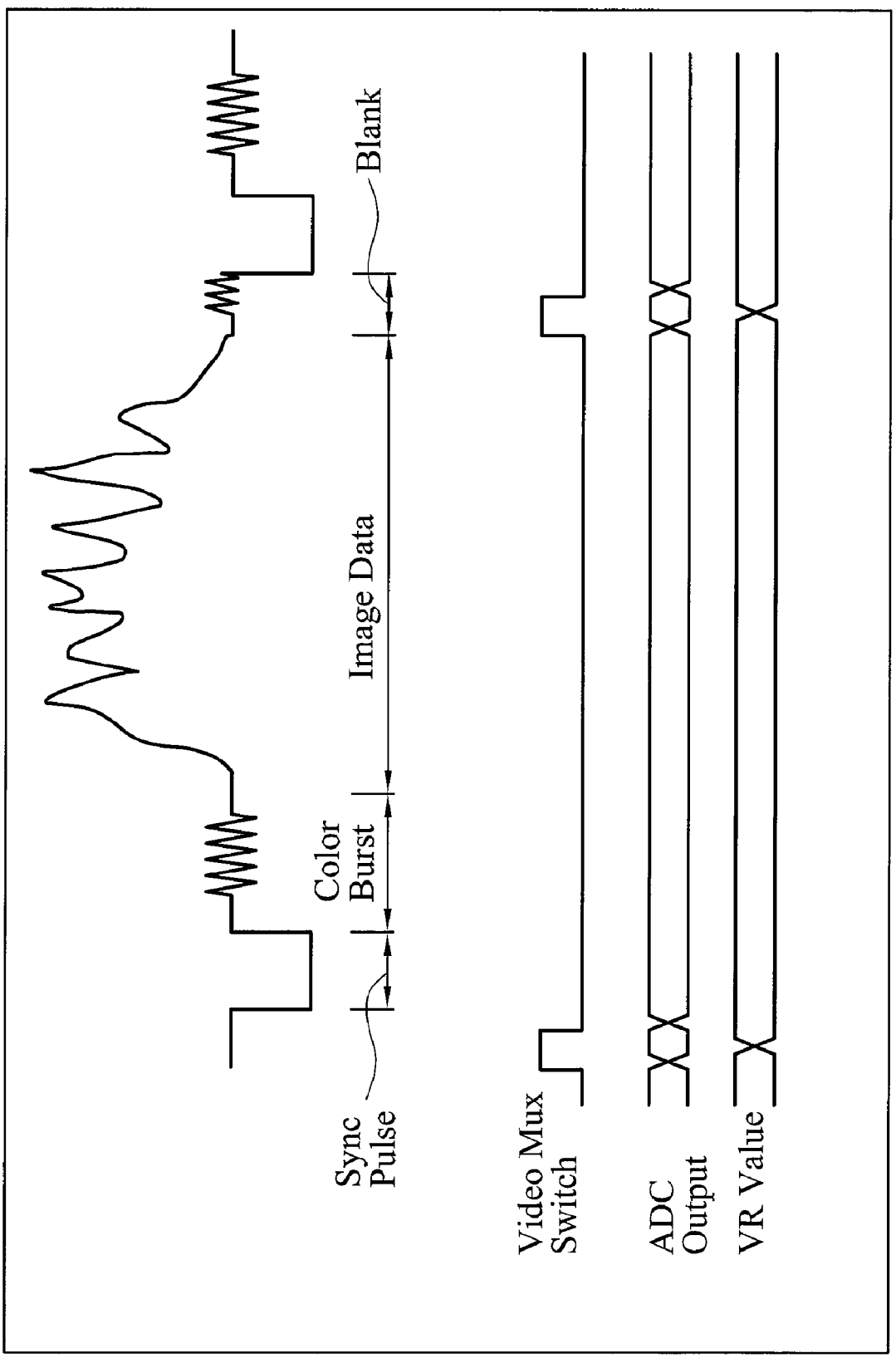
FIG. 8 shows the timing of signals under blank mode.

C. Blank mode: like multiple-frequency mode, if analog video signal 602 originates with a plurality of interfaces and ADC 607 may not be freed from processing the analog video signal, blank mode can be used such that analog control signal 610 and analog video signal share ADC 607. FIG. 8 shows the timing of signals under blank mode. Analog video signal 602 in FIG. 8 has Sync. pulse, color burst, image data and blank periods. In blank mode, controller 604 generates a signal of video mux switch during horizontal blanking interval (HBI) or vertical blanking interval (VBI) to dedicate ADC 607 to analog control signal 610. The blank period in FIG. 8 is HBI when signal of video mux switch turns into a high level. Working in blank mode, clock generator 605 generates a normal, not frequency-multiplied clock.

Switching multiplexer 603 causes some output data of ADC 607 to represent the resistance value of a variable resistor in blank period in which data variation is imperceptible. In blank mode, the high level of video mux switch signals directs the output of ADC 607 to be stored in storage buffer 6113. Thus, the resistance value of a resistor, carried by the analog control signal 610, can be obtained without decoding of the video signal.

Figure 9:
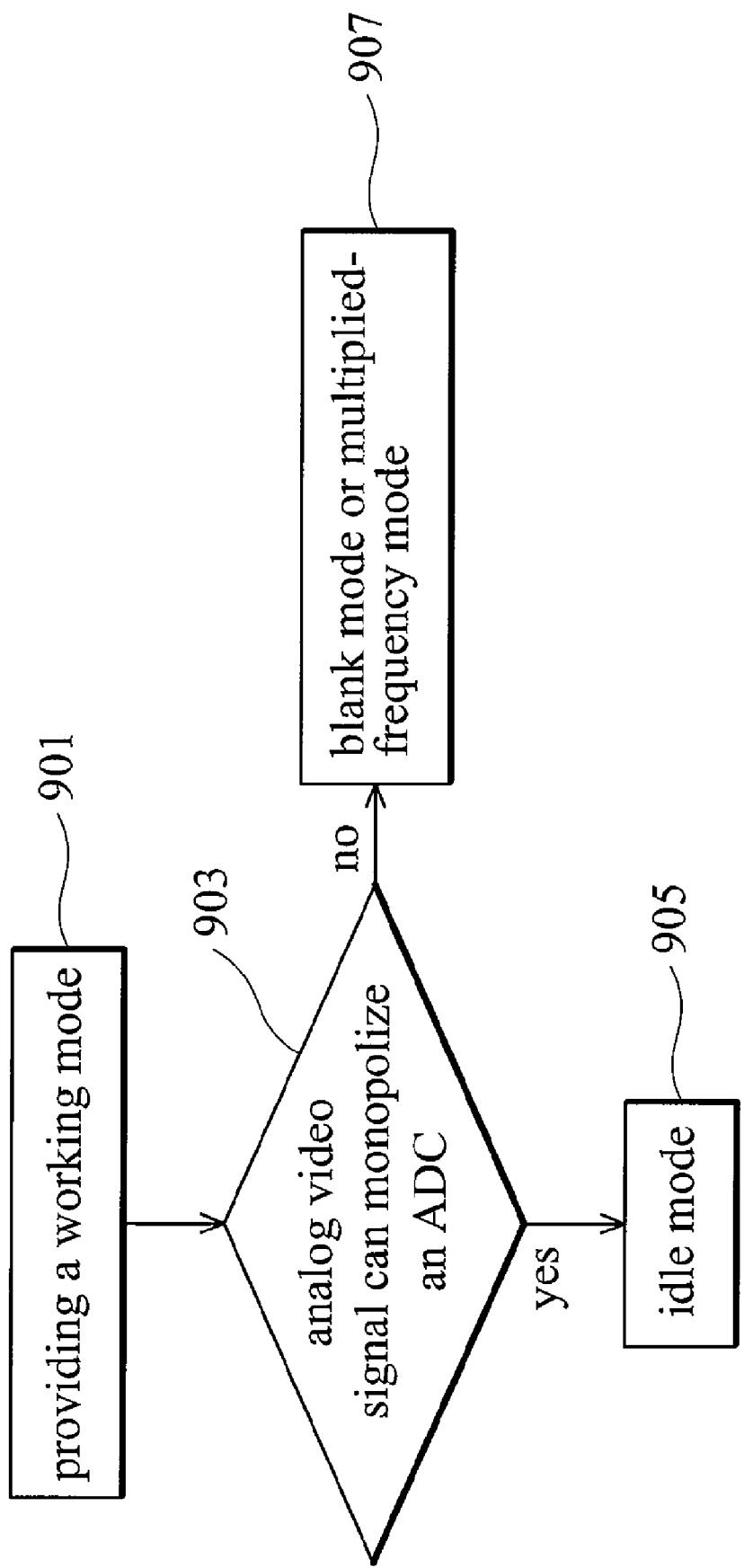
FIG. 9 shows a video processing method according to embodiments of the invention.

Complying with the configurations mentioned before, FIG. 9 shows a video processing method according to embodiments of the invention. Working modes, such as idle mode, multiple-frequency mode and blank mode are provided in step 901. It is determined in step 903 whether analog control signal can monopolize an ADC. If so, the method proceeds to step 905 where idle mode is selected. If not, the method proceeds to step 907 where blank mode or multiple-frequency mode is selected. This video processing method may be executed by way of a processor with a proper program, or a system designer who, knowing the application environment of a video processing apparatus, selects a working mode by setting parameters in a register set such that a storage controller accordingly works under the selected working mode.

While the invention has been described by way of examples and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video processing method suitable for use with an analog user interface and a digital video decoder, comprising:
    providing a working mode according to whether an analog control signal can monopolize an analog-to-digital converter, wherein the working mode is a first mode if the analog control signal can monopolize the analog-to-digital converter, and the working mode is a second mode if the analog control signal cannot monopolize the analog-to-digital converter; and
    based upon the working mode, switching the analog control signal to the analog-to-digital converter of the digital video decoder, wherein the analog control signal is from the analog user interface, and wherein, under the second mode, the video processing method further comprises multiplying the clock frequency of the analog-to-digital converter to obtain an extra bandwidth in which the analog-to-digital converter converts the analog control signal.

2. The video processing method as claimed in claim 1, wherein the working mode is predetermined.

3. A video processing apparatus, comprising:
    a multiplexer receiving an analog video signal and an analog control signal to selectively output one thereof, wherein the analog control signal is from the analog user interface;
    an analog-to-digital converter converting the output of the multiplexer into a digital signal;
    a digital signal processor for processing the digital signal; and
    a switching means providing a working mode to accordingly control the multiplexer wherein the switching means comprises a storage controller receiving a plurality of parameters to accordingly determine the working mode.

4. The video processing apparatus as claimed in claim 3, further comprising:
    a register set registering the digital signal from the analog-to-digital converter and the parameters from a digital interface, wherein the parameters are used for setup of the video processing apparatus, and wherein the storage controller receives the parameters from the register set to accordingly determine the working mode and control the timing of the register set.

5. The video processing apparatus as claimed in claim 4, wherein the switching means comprises:
    a storage buffer buffering the digital signal from the analog-to-digital converter into the register set, and wherein the storage controller receives the parameters from the register set to accordingly determine the working mode and control the timing of the storage buffer.

6. The video processing apparatus as claimed in claim 4, wherein the switching means comprises:
    two storage buffers respectively buffering the two digital signal from the analog-to-digital converter to the register set, and wherein the storage controller receives the parameters from the register set to accordingly determine the working mode and control the timing of the buffer; and
    a clock generator providing clock signal to the analog-to-digital converter, the buffer, the storage controller, and the multiplexer.

7. The video processing apparatus as claimed in claim 3, wherein the analog user interface comprises a variable resistor.

8. The video processing apparatus as claimed in claim 3, wherein the digital interface is further coupled to a microprocessor.

9. The video processing apparatus as claimed in claim 8, wherein the microprocessor reads data to accordingly provide the parameters to the video processing apparatus.

* * * * *